US 10,643,398 B2

(12) United States Patent
Esselstrom et al.

(10) Patent No.: US 10,643,398 B2
(45) Date of Patent: May 5, 2020

(54) DEPTH RAY LAYER FOR REDUCED VISUAL NOISE

(71) Applicant: Microsoft Technology Licensing, LLC, Redmond, WA (US)

(72) Inventors: Tyler P. Esselstrom, Mercer Island, WA (US); Craig R. Maitlen, Redmond, WA (US); John Edward Churchill, Monroe, WA (US); Joseph Wheeler, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/042,862

(22) Filed: Jul. 23, 2018

(65) Prior Publication Data
US 2020/0027280 A1 Jan. 23, 2020

(51) Int. Cl.
*G06T 19/20* (2011.01)
*G06T 7/194* (2017.01)
(Continued)

(52) U.S. Cl.
CPC ............ *G06T 19/20* (2013.01); *G06T 7/194* (2017.01); *G06T 7/50* (2017.01); *G06T 7/90* (2017.01); *G06T 2219/2012* (2013.01)

(58) Field of Classification Search
CPC .......... G06T 19/20; G06T 7/194; G06T 7/50; G06T 7/90; G06T 2219/2012
See application file for complete search history.

(56) References Cited

U.S. PATENT DOCUMENTS 6,084,556 A 7/2000 Zwern
8,493,383 B1 * 7/2013 Cook ............... G06T 15/06
345/419
(Continued)

FOREIGN PATENT DOCUMENTS

EP 1077421 A2 2/2001
WO 2011087289 A2 7/2011
WO 2015048911 A1 4/2015

OTHER PUBLICATIONS

Bedford, Aurora, "Ensure High Contrast for Text Over Images", Retrieved from: https://www.nngroup.com/articles/text-over-images/, Oct. 18, 2015, 10 Pages.
(Continued)

*Primary Examiner* — Yu Chen
(74) *Attorney, Agent, or Firm* — Holzer Patel Drennan

(57) ABSTRACT

The described technology includes a depth ray shader stored in memory and executable to receive a depth map defining a depth in association with each pixel in a three-dimensional scene and define a color gradient between a first pixel value and a second pixel value, wherein each sequential step in the color gradient between the first pixel value and the second pixel is assigned to a corresponding depth of increasing magnitude relative to a reference point. The depth ray shader is further executable to provide an instruction to a graphics engine to cause the graphics engine to apply a depth ray layer to a select portion of the three-dimensional scene, the depth ray layer altering each pixel in the selected portion to assume a pixel value defined within the color gradient to correspond to a depth of the pixel specified by the depth map.

20 Claims, 6 Drawing Sheets

(51) Int. Cl.
G06T 7/50 (2017.01)
G06T 7/90 (2017.01)

(56) References Cited

U.S. PATENT DOCUMENTS

| | | | |
|---|---|---|---|
| 8,584,028 B2* | 11/2013 | Abanami | G06F 3/0481 |
| | | | 715/768 |
| 9,230,368 B2 | 1/2016 | Keane et al. | |
| 9,659,381 B2 | 5/2017 | Mullins et al. | |
| 9,721,391 B2 | 8/2017 | Monaghan et al. | |
| 2003/0142068 A1 | 7/2003 | Deluca et al. | |
| 2008/0174600 A1* | 7/2008 | Xie | G06T 15/60 |
| | | | 345/426 |
| 2011/0231757 A1 | 9/2011 | Haddick et al. | |
| 2012/0063680 A1* | 3/2012 | Daisy | G06T 15/205 |
| | | | 382/165 |
| 2013/0077893 A1* | 3/2013 | Moon | G06T 5/002 |
| | | | 382/299 |
| 2013/0127823 A1 | 5/2013 | Diverdi et al. | |
| 2013/0335442 A1 | 12/2013 | Fleck et al. | |
| 2014/0132484 A1 | 5/2014 | Pandey et al. | |
| 2017/0007350 A1* | 1/2017 | Popovic | A61B 1/00009 |
| 2017/0105052 A1 | 4/2017 | Defaria et al. | |
| 2018/0096463 A1* | 4/2018 | Kim | G06T 5/002 |
| 2018/0139436 A1* | 5/2018 | Yucer | G06T 7/564 |
| 2018/0174355 A1* | 6/2018 | Day | G06T 15/08 |
| 2018/0374256 A1* | 12/2018 | Bakalash | G06T 19/006 |
| 2019/0066306 A1* | 2/2019 | Masuda | G06T 7/13 |
| 2019/0068973 A1* | 2/2019 | Hamilton | H04N 19/132 |

OTHER PUBLICATIONS

Dao, et al., "Early steps towards understanding text legibility in handheld augmented reality", In Proceedings of IEEE Virtual Reality, Mar. 18, 2013, pp. 159-160.

Debernardis, et al., "Text Readability in Head-Worn Displays: Color and Style Optimization in Video versus Optical See-Through Devices", In Journal of IEEE Transactions on Visualization and Computer Graphics, vol. 20, Issue 1, Jan. 2014, pp. 125-139.

Fiorentino, et al., "Augmented Reality Text Style Readability with See-Through Head-Mounted Displays in Industrial Context", In Journal of Presence: Teleoperators and Virtual Environments, vol. 22, Issue 2, Aug. 2013, pp. 171-190.

Gabbard, "Active Text Drawing Styles for Outdoor Augmented Reality: A User-Based Privileged and Confidential 7 AS7/GG/AR Study and Design Implications", In Proceedings of IEEE Virtual Reality, Mar. 10, 2007, pp. 35-42.

Gabbard, et al., "The Effects of Text Drawing Styles, Background Textures, and Natural Lighting on Text Legibility in Outdoor Augmented Reality", In Journal of Presence, vol. 15, Issue 1, Feb. 2006, pp. 1-17.

Gattullo, et al., "Legibility in Industrial AR: Text Style, Color Coding, and Illuminance –", In Proceedings of IEEE Computer Graphics and Applications, vol. 35, Issue 2, Mar. 2015, pp. 52-61.

Hell, Stefan, "Augmented Virtual Space: Visualizations in a Multi-Device Virtual Environment", In Thesis of Technische Universitat Munchen, Feb. 2015, 3 Pages.

Jankowski, et al., "Integrating Text with Video and 3D Graphics: The Effects of Text Drawing Styles on Text Readability", In Proceedings of the SIGCHI Conference on Human Factors in Computing Systems, Apr. 10, 2010, pp. 1321-1330.

Jankowski, et al., "On the Design of a Dual-Mode User Interface for Accessing 3D Content on the World Wide Web", In International Journal of Human-Computer Studies, vol. 71, Issue 7, Jul. 2013, pp. 1-22.

Leykin, et al., "Determining text readability over textured backgrounds in augmented reality systems", In Proceeding of the ACM SIGGRAPH international conference on Virtual Reality continuum and its applications in industry, Jun. 16, 2004, pp. 436-439.

"International Search Report and Written Opinion Issued in PCT Application No. PCT/US2019/037845", dated Nov. 20, 2019, 12 Pages.

Yuki, et al., "Theoretical Studies of the Structure and Aromaticity of Conjugation Four-membered Ring Continuum with Simple Combination Procedure of Combining Kekule Structures", Submitted to Department of Chemistry, vol. 107, Gifu University, Jan. 1, 2009, 1 Page.

* cited by examiner

DEPTH RAY LAYER FOR REDUCED VISUAL NOISE

BACKGROUND

When designing application graphics and user interfaces, software developers make efforts to ensure that selected pixel colors, textures, and shading provide adequate contrast between foreground and background objects. When there exists a low level of contrast between foreground and background objects, such as when white text is placed on a beige background, the foreground objects may become difficult to see. Further, some developers strive to comply with regulatory anti-discrimination guidelines that define set color contrast requirements, such as to ensure that people with visual disabilities (e.g., color blindness) have equal access to services. For this reason, many computer operating systems provide an adjustable contrast setting that permits a user to selectively increase a contrast level between foreground and background objects displayed on a computer screen.

Since foreground and background objects may frequently shift relative to one another in 3D applications, the challenges associated with ensuring adequate contrast between foreground and background objects are significantly increased for software developers working in the rapidly-emerging 3D virtual reality and/or augmented reality tech industry.

BRIEF DESCRIPTIONS OF THE DRAWINGS

SUMMARY

Figure 1:
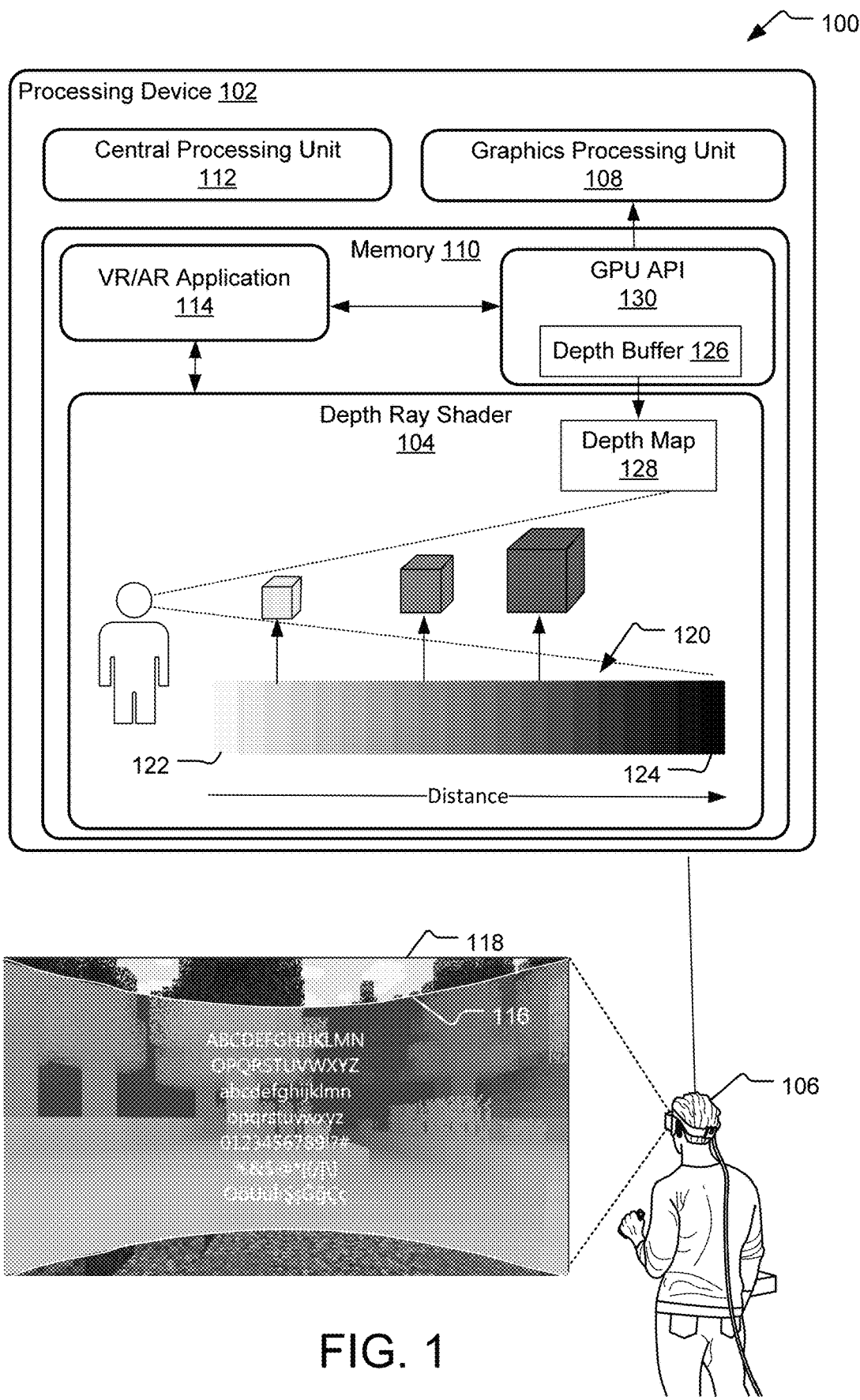
FIG. 1 illustrates an example graphics system that selectively replaces portions of a three-dimensional scene rendered by a processor with pixel values that reduce background noise while also preserving a depth and shape of objects in the three-dimensional scene.

A system for reducing visual noise in a three-dimensional scene includes a depth ray shader that receives a depth map specifying a depth in association with each pixel in a three-dimensional scene and to assign depth values to colors of a color gradient spanning between a first pixel value and a second pixel value. In one implementation, each sequential step in the color gradient between the first pixel value and the second pixel is assigned to a corresponding depth of increasing magnitude relative to a reference point. The depth ray shader is further executable to provide an instruction executable by a graphics engine to replace a select portion of the three-dimensional scene with a depth ray layer, the depth ray layer altering each pixel in the selected portion to assume a pixel value defined within the color gradient to correspond to a depth of the pixel included within the color gradient that corresponds to the depth associated with the pixel by the depth map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTIONS

In 3D applications, objects are often designed to appear floating in space relative to other objects and fixed in within a same coordinate system as the user. As the user walks around, the relative positions of foreground and background objects shift relative to one another based on the user's position. For example, a user may walk from left to right in front of a foreground object or even walk around the foreground object. During this movement, background objects shift in position relative to the foreground object consistent with the user's line of sight. As a result, the alignment between background and foreground objects may change continuously. This constant, user-dependent variation in alignment between foreground and background objects increases the difficulty in ensuring continuous adequate contrast throughout the user's entire 3D experience. As used herein, "adequate contrast" refers to a contrast ratio satisfying a defined threshold. In some jurisdictions, other regulatory guidelines provide for minimum contrast ratios that may depend upon the size of text or other graphics on a screen.

One common approach to reducing background noise (and thereby, increasing contrast) is to use various visual effects to blur background areas of a scene that may interfere with a user's ability to decipher a foreground object. For example, a background region of a scene may be blurred to reduce texture, and text may then be presented on top of the blurred region. Blurring can be computationally costly to implement and is therefore not feasible in all applications. Further, blurring in 3D environments is also known to cause annoyance to some users.

Still another approach to ensuring adequate foreground and background contrast is to simply "erase" background objects in regions overlapping or proximal to foreground objects. For example, floating white text may be presented against a solid black rectangle in the middle of the scene as compared to floating in isolation directly adjacent to (having edges in contact with) pixels representing the background of the scene. However, in virtual reality applications, the sudden disruption of 3D continuity is known to cause user discomfort including feelings of disorientation, dizziness, and in some cases motion sickness. For these reasons, it is desirable to provide a solution that ensures adequate contrast while still preserving the user's general perception of the shapes of background objects and the depths associated with those objects.

The herein disclosed technology provides a graphical technique that can be implemented to selectively reduce noise (and thereby improve contrast) by altering select pixel values to replace the colors and textures of background objects with depth-based pixel values selected from a sliding-scale color gradient referred to herein as a "depth ray layer." According to one implementation, a depth ray layer is selectively drawn over an immersive 3D experience to control color and contrast of underlying (e.g., background) objects. The depth ray layer defines a smooth color ramp wherein each step along the ramp is assigned to a corresponding increasing or decreasing distance from a user. For example, increasingly darker shades of blue may be assigned to increasingly greater distances from the user.

Application of the depth ray layer has the effect of masking a defined region of the scene to remove original background colors and texture. Original pixel values are replaced with values from the smooth color ramp selected based on a depth of corresponding scene objects relative to a user. This technique preserves the shapes of virtual objects and the apparent depths of those virtual objects relative to the user while also reducing noise at low computational cost and without causing user disorientation or disrupting the user's 3D experience. As explained further below, the depth ray layer can be applied to mask a background of an entire 3D scene or to selectively mask a portion of a 3D scene, such as a portion that is behind foreground text.

FIG. 1 illustrates an example graphics system 100 that selectively replaces portions of a three-dimensional scene rendered by a processor with pixel values that reduce background noise while also preserving a depth and shape of objects in the three-dimensional scene. As used herein, "noise" refers to low levels of contrast, such as when a foreground color and a background color are similar and a ratio of the two exceeds a predefined threshold. The graphics system 100 is incorporated within a processing device 102 that includes memory 110 storing one or more applications executable by a central processing unit (CPU) 112. In addition to the CPU 112, the processing device 102 may include a graphics processing unit (GPU) 108 that executes rendering instructions from the various applications to render graphics within a field of view of a user 106 (e.g., either as pixels on a screen or a projection of pixels into three-dimensional space).

In FIG. 1, the memory 110 is shown to include two applications—a depth ray shader 104 and a VR/AR application 114. As used herein, a "VR/AR" application refers to any virtual reality or augmented reality application that provides a user with a 3D experience. In general, the depth ray shader 104 is executable to selectively alter pixel values to improve visual contrast of graphics generated by the VR/AR application 114 while preserving shapes and relative depths associated with various graphical objects. Although the operations of the depth ray shader 104 are primarily discussed with respect to noise reduction in 3D applications (e.g., where objects are frequently shown to shift relative to one another), it should be understood that the same or similar techniques may be similarly implemented with equal efficacy for reducing noise in 2D applications. Thus, in some implementations, the VR/AR application 114 is a 2D application.

Although the processing device 102 may assume a variety of forms in different implementations (e.g., a mobile device, desktop computer, tablet), the processing device 102 is, in FIG. 1, shown to be a head-mounted device (HMD) that uses one or more optical systems to project virtual content within the field of view of a user 106. In this implementation, the HMD device is configured for operation in one or more mixed reality use modes, such as a virtual reality mode (where the user sees exclusively virtual surroundings) or an augmented reality mode (where the user sees one or more projected virtual objects against real-world surroundings).

In various implementations, the depth ray shader 104 may be implemented in different ways, such as in the form of a plug-in to the VR/AR application 114, an operating system tool, or as part of an application programming interface (API) to the GPU 108 (e.g., within a GPU API 130).

When selectively invoked by the VR/AR application 114, the depth ray shader 104 provides the GPU API 130 with an instruction to render a depth ray layer 116 to alter a subset of pixels within a graphical scene (hereinafter "the scene 118") that is actively being rendered by the VR/AR application 114. The depth ray layer 116 can be understood as a mask that is applied to alter values for a subset of scene pixels to improve contrast in the associated area.

In one implementation, the depth ray layer 116 is applied to a discrete pixel region of the scene 118, such as the generally rectangular region shown in FIG. 1 (with curvature to indicate the user's apparent three-dimensional presence within the scene 118). The discrete pixel region may include one or more background objects within the scene 118 and/or span a portion of the scene 118 that appears adjacent to a foreground object (e.g., text) according to a current line of sight of the user 106. In still other implementations, the depth ray layer 116 is applied to all pixels of the scene 118 rather than to a subset of the scene 118. The depth ray layer 116 may—as in FIG. 1—be defined to selectively exclude pixels that are defined to represent foreground object(s) (e.g., by excluding the white text shown in the scene 118).

In one implementation, the VR/AR application 114 selectively calls on the depth ray shader 104 to present the depth ray layer 116 responsive to satisfaction of predetermined scene criteria, such as when certain menu options are being presented or when there exists a likelihood that user movements (e.g., looking around) may cause a foreground and background object with insufficient contrast to move into alignment with one another.

The depth ray shader 104 has access to a depth map 128 that defines z-direction depths of various objects within the scene 118 relative to the user 106. In FIG. 1, the depth ray shader 104 retrieves the depth map 128 from a depth buffer 126 managed by a GPU API 130. The depth ray shader 104 uses the depth map 128 to select new pixel values for a set of the pixels predefined in association with the depth ray layer 116. Repurposing the depth buffer 126 in this way allows the depth ray layer 116 to be implemented at minimal processing costs.

The depth ray shader 104 defines a smooth color ramp 120, also referred to herein as a color gradient. Although shown in black and white in FIG. 1, the smooth color ramp 120 may include one or more hues (colors) that vary from one another in at least one of tint, tone, and shade. For example, the smooth color ramp 120 may include a range of blue pixel values, ranging from shades of light blue to dark blue. As shown in FIG. 1, the smooth color ramp 120 extends between a first pixel value 122 and a second pixel value 124, with a smooth ramp of variable pixel values (e.g., varying tints, tones, and/or shades) therebetween. The depth ray shader 104 assigns a depth value of increasing magnitude to each sequential step in the smooth color ramp 120. For example, a particular light shade pixel value may be assigned to an object depth of 1 meter from the user 106 while a particular medium shade pixel value is assigned to an object depth of 4 meters from the user 106 and a particular dark shade pixel value is an assigned to an object depth of 10 meters from the user 106.

The values of the smooth color ramp 120 may, in different implementations, may be selected in different ways. In one implementation, the first pixel value 122 is set to correspond to the shallowest depth value (e.g., the closest object) currently in the depth map 128 while the second pixel value 124 is set to correspond to the deepest depth value (e.g., the furthest object) currently represented in the depth map 128. The actual hue(s) included within the color gradient may be similarly predefined. In one implementation, the color(s) included in the smooth color ramp 120 are selected based on the color(s) of foreground objects positioned adjacent to pixels of the depth ray layer 116 (e.g., a predefined subset of pixels), such as foreground objects that are either adjacent the pixels of the depth ray layer 116 and/or overlapping such pixels along a user's line of sight. In another implementation, foreground objects are selected based on personalized preferences of the user 106, the color(s) included in the smooth color ramp 120 are selected based on preferences defined in a user's identity profile for the VR/AR application 114.

Using the smooth color ramp 120 and the depth map 128 associated with the scene 118, the depth ray shader 104 identifies a pixel value from the smooth color ramp 120 that corresponds to each pixel represented by the depth map 128 that is also included within a predefined subset of pixels that are to be affected by application of the depth ray layer 116. This predefined subset of pixels is referred to below as a predefined depth ray region.

For each pixel in the predefined depth ray region, the depth ray shader 104 selectively alters a pixel value (e.g., as initially defined by the VR/AR application 114) to assume a value included within the smooth color ramp 120 that is assigned to the z-depth of the corresponding pixel in the scene 118, as defined by the depth map 128. For example, the predefined depth ray region may be a discrete pixel region including one or more background objects of the scene 118. Of these objects, those defined to appear in closer proximity to the user 106 may have pixel values representing shades similar to the shade represented by the first pixel value 122 while those defined to appear in further proximity to the user 106 have pixel values representing shades similar to the shade represented by the second pixel value 124.

In some applications (such as those shown in FIGS. 2-3), the predefined depth ray region includes a discrete pixel region (e.g., a region interior to an enclosed parameter, such as a rectangular pixel region) but excludes a select subset of pixels interior to a boundary of the discrete pixel region that are associated with a defined foreground object. Likewise, as shown in greater detail with respect to FIG. 4, the depth ray layer 116 may, in other implementations, include a discrete pixel region that partially or entirely internal to a boundary of one or more foreground objects, such as to give the appearance that the foreground object is transparent.

In each instance of use, the depth ray layer 116 evenly reduces or eliminates visual noise otherwise apparent in the corresponding pixels of the scene 118. In effect, the depth ray layer 116 removes scene textures but preserves the shapes and depths of scene objects, guaranteeing sufficient contrast between different objects encapsulated within the depth ray layer 116 and/or contrast between the depth ray layer 116 and foreground objects excluded from the depth ray layer 116.

Figure 2:
FIG. 2 illustrates images of a processor-rendered scene before and after application of an example depth ray layer.
Figure 2:
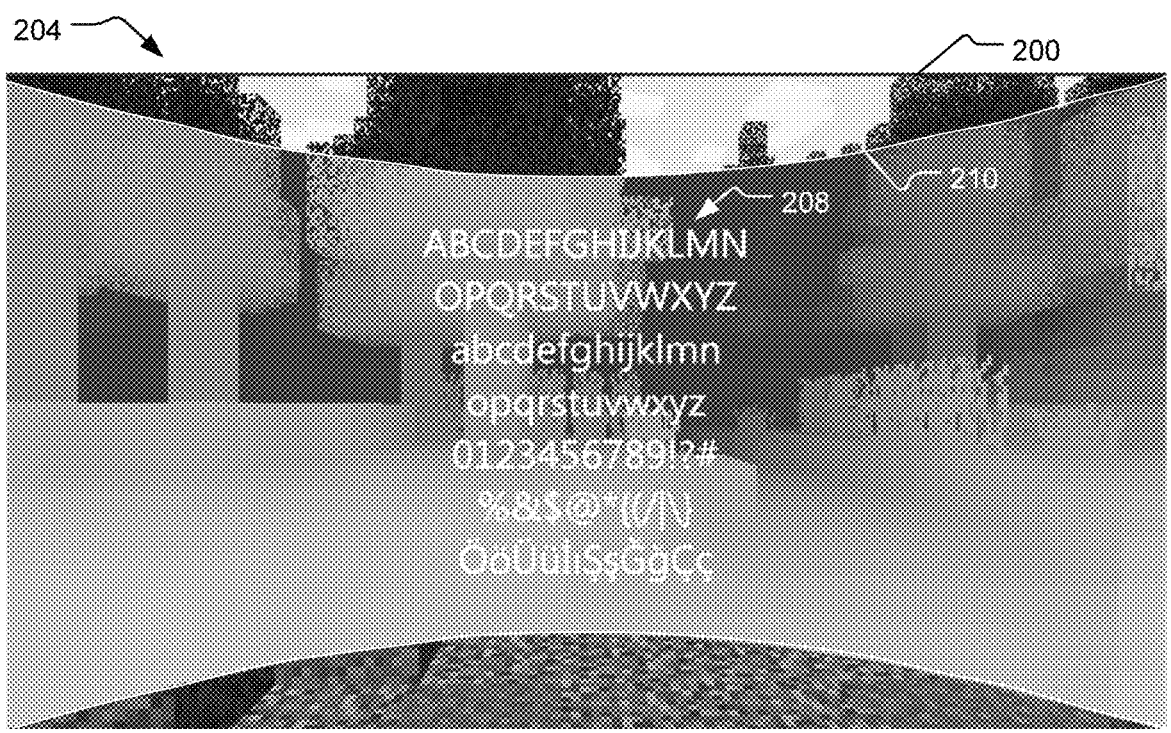

FIG. 2 illustrates images (202 and 204) of a processor-rendered three-dimensional scene (hereinafter "scene 200") before and after application of an example depth ray layer 210. The scene 200 includes a number of objects that are designed to appear at varying depths from a user. A before image 202 of the scene 200 illustrates white text 208 presented in scene foreground against various background objects (e.g., the foreground text and background objects are overlapping along the user's line of sight). Here, the various textures in the scene background create visual noise (regions of low contrast with the foreground text) that make portions of the white text difficult to read.

An after image 204 of the scene 200 illustrates a reduction in noise that is achieved by applying a depth ray layer 210 to a discrete pixel region of the scene 200. Various attributes of the depth ray layer 210 may be the same or similar to those described with respect to FIG. 1. Here, the discrete pixel region encompassed by the depth ray layer 210 is a generally rectangular region extending horizontally across a center of the user's field of view. The discrete pixel region has a boundary (e.g., shown by white lines bounding the depth ray layer 210), and all pixels internal to this boundary are included in the depth ray layer 210 except for those pixels that correspond to the foreground text. Thus, the foreground text is excluded from the depth ray layer 210 and unaffected by its application.

As described with respect to FIG. 1, the depth ray layer 210 may be generated by a depth ray shader that defines a color gradient and assigns each increasing step in the color gradient a different depth (z-value coordinate) relative to a user. In one implementation, the depth ray shader retrieves depth information in association with each pixel of the scene 200, such as by accessing data in an existing depth buffer associated with a virtual reality application generating the scene 200. The depth ray generator alters each pixel predefined as being included within the depth ray layer 210 to assume a pixel value selected from the defined color gradient that corresponds to the retrieved depth (z-value) of the pixel.

In the example depth ray layer 210, shallower depths (smaller z-values) are associated with whiter shades and shades of increasing darkness correspond to distances of increasing depth. Due to application of the depth ray layer 210, a user enjoys uninterrupted awareness of the shapes and distances to each of the objects in the scene 200 while also being provided with a guaranteed minimum contrast that makes foreground objects, such as the white text, easy to decipher.

Since FIG. 2 is depicted in black and white, the reduction in noise illustrated by the after image 204 is not as visually prominent as in other real-world applications of this technology where the color gradient scale of the depth ray layer 210 may be selected to ensure a sufficiently high minimum level of contrast with the foreground text. If, for example, the foreground text is white, and the color gradient is a range of blues (from light blue to dark blue), the lightest blue in the depth ray layer 210 may be selected to provide for a sufficient degree of contrast with the foreground white text 208. Although the depth ray layer 210 may be designed to ensure any minimum contrast ratio, one implementation of the technology implements a minimum contrast ratio of 4.5 to 1 (e.g., between the foreground text and the colors in the depth ray layer 210).

Figure 3:
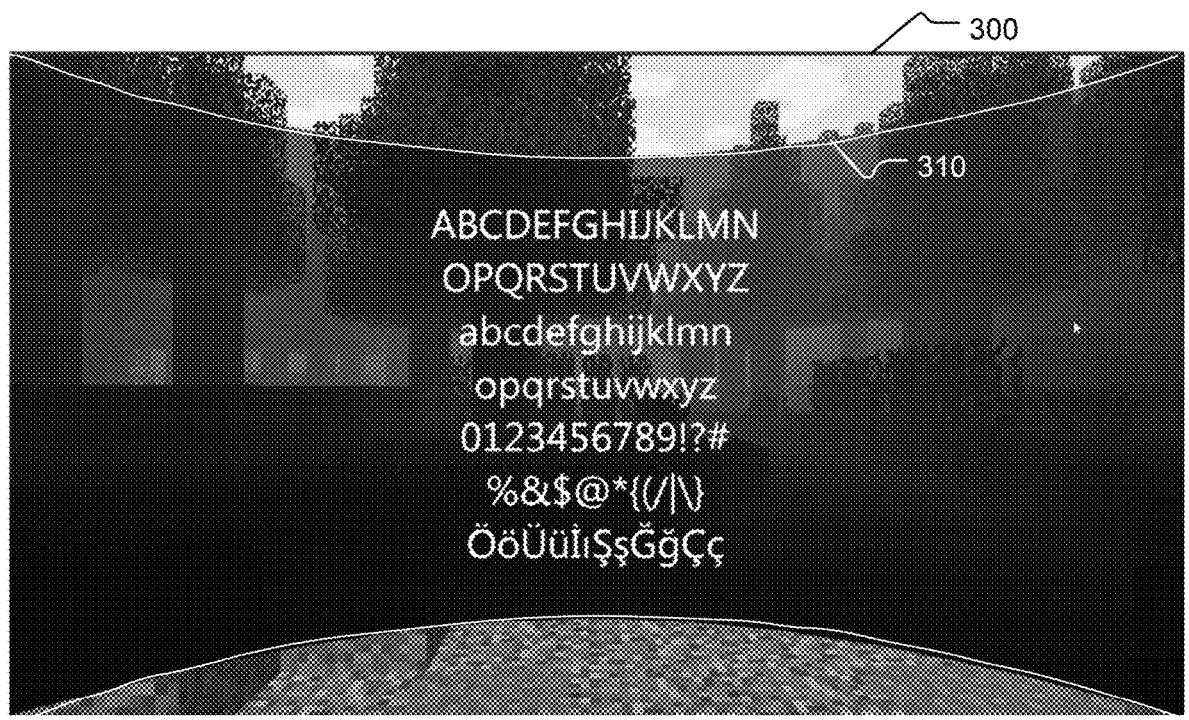
FIG. 3 illustrates another example depth ray layer applied to a processor-rendered three-dimensional scene.

FIG. 3 illustrates another depth ray layer 310 applied to a processor-rendered three-dimensional scene ("scene 300"), which includes features the same or similar to those of the scene 200 shown in FIG. 2. In FIG. 3, the depth ray layer 310 maps a color gradient to various depths according to a manner opposite that shown via the depth ray layer 210 of FIG. 2. Here, shades of decreasing darkness correspond to distances of increasing depth. Thus, shallower depths (smaller z-values) are associated with darker shades and deeper depths are associated with lighter shades. Other aspects of the depth ray layer 310 not described in detail may be the same or similar to those described with respect to the FIGS. 1 and 2.

Figure 4:
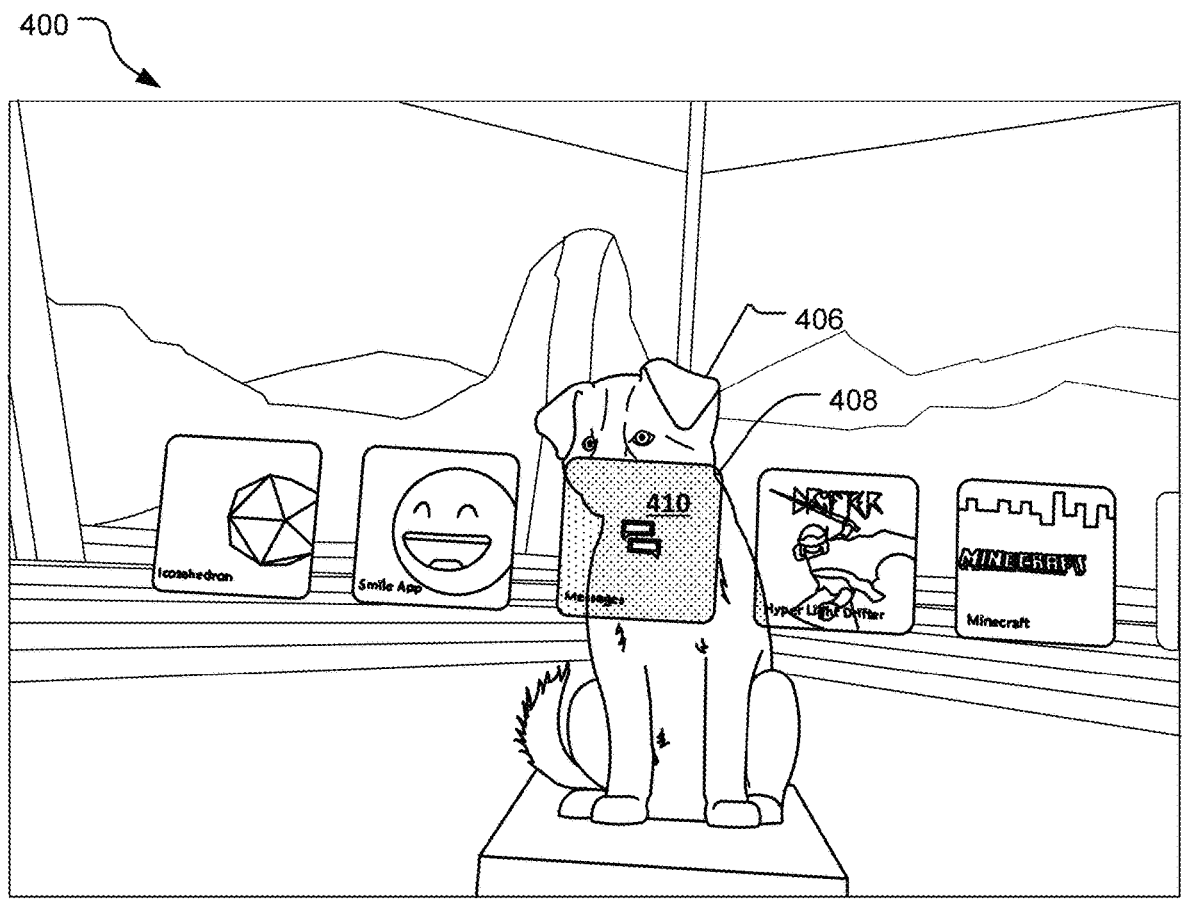
FIG. 4 illustrates still another example depth ray layer applied to a processor-rendered three-dimensional scene.

FIG. 4 illustrates still another example depth ray layer 410 applied to a processor-rendered three dimensional scene ("scene 400"). The scene 400 includes a number of selectable icons in the foreground that appear in front of a puppy avatar 406. One of these selectable icons, an icon 408, is designed to appear semi-transparent when in alignment with the puppy avatar 406, as shown. The depth ray layer 410 alters pixel values internal to a boundary of the icon 408 to illustrate the shape of the puppy avatar 406 while simultaneously mitigating visual noise. Consequently, the outline of the puppy avatar 406 is visible in a region interior to the icon 408. In contrast with the example depth ray layers in FIGS. 2-3, the depth ray layer 410 exclusively affects pixels that are interior to the boundary of a foreground object. In this example, the depth ray layer 410 includes two pixel values—one pixel value corresponding to a depth associated with the puppy avatar 406 and another pixel value corresponding to a depth associated with a depth of the scene behind the puppy avatar 406.

Figure 5:
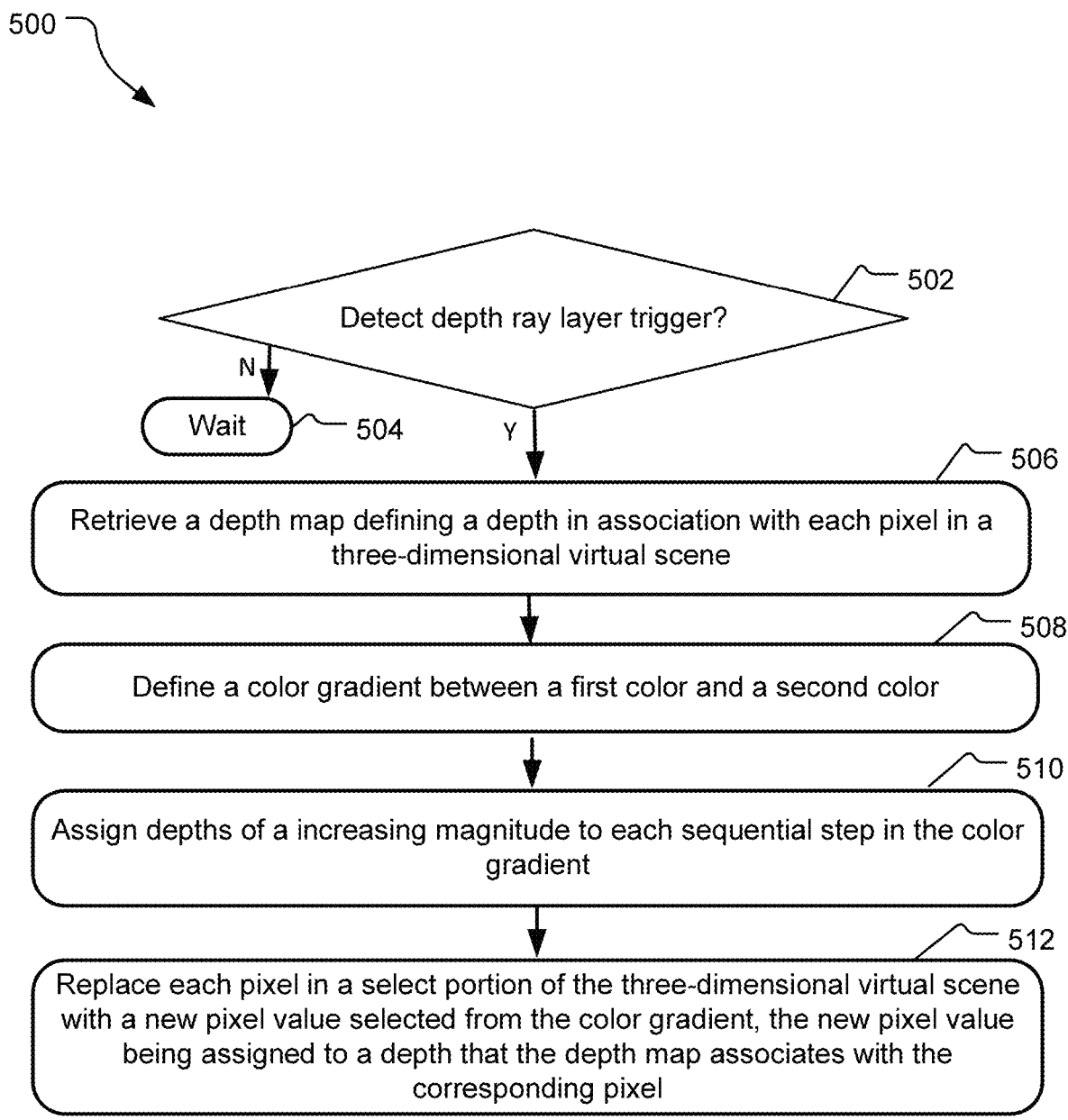
FIG. 5 illustrates example operations for applying a depth ray layer to reduce visual nose in a processor-rendered three-dimensional scene.

FIG. 5 illustrates example operations 500 for applying a depth ray layer to reduce visual nose within a processor-rendered three-dimensional scene. A trigger detection operation 502 determines whether current scene conditions satisfy predefined criteria for triggering application of a depth ray layer.

In different implementations, the predefined criteria may assume different forms and the depth ray layer may be applied responsive to satisfaction of a range of defined conditions. In one implementation, the predefined criteria are deemed satisfied when the user provides an input requesting the presentation of menu options (e.g., text and/or icons) in the foreground of the scene. In another implementation, the predefined criteria are satisfied when there exists a threshold probability of insufficient contrast occurring, such as when the scene includes background objects and foreground objects of similar color that could potentially come into alignment if the user takes a particular action. In still another implementation, the predefined criteria are satisfied when a user provides an input to deliberately trigger application of the depth ray layer, such as by selecting a "high contrast" option from an application menu.

If the trigger detection operation 502 determines that the current scene conditions do not satisfy the predefined criteria triggering application of the depth ray layer, a waiting operation 504 is entered until the predefined criteria are satisfied.

Once the trigger detection operation 502 determines that the current scene conditions do satisfy the predefined criteria, a depth map retrieval operation 506 retrieves a depth map corresponding to the three-dimensional scene. The depth map specifies a depth in association with each pixel of a predefined subset affected by the depth ray layer. In one implementation, the depth map retrieval operation 506 retrieves the depth map from an already-existing depth buffer associated with an application actively generating processor-executable instructions for rendering in the three-dimensional scene.

A defining operation 508 defines a color gradient including a smooth ramp of shades, tints, and/or tones between a first color and a second color. In one implementation, the color gradient includes different shades, tones, and tints of a same hue. For example, the color gradient defines a range of reds ranging from light to dark or vice versa.

A depth assignment operation 510 assigns depths of increasing magnitude to each sequential step represented by the color gradient. In one implementation, the depth map assignment operation 510 is performed by scaling the range of depth values included in the depth map to encompass the full range of pixel values represented by the color gradient. For example, a first end of the color gradient may be defined to correspond to a shallowest (smallest Z-value) depth included in the depth map while a second end of the color gradient may be defined to correspond to a deepest (largest Z-value) depth included in the depth map.

A pixel replacement operation 512 provides a graphics engine with one or more instructions executable to selectively replace each pixel in a predefined subset of scene pixels with a new pixel value selected from the color gradient that is also assigned (by the assigning operation 510) to a same depth that the depth map associates with the corresponding scene pixel.

Figure 6:
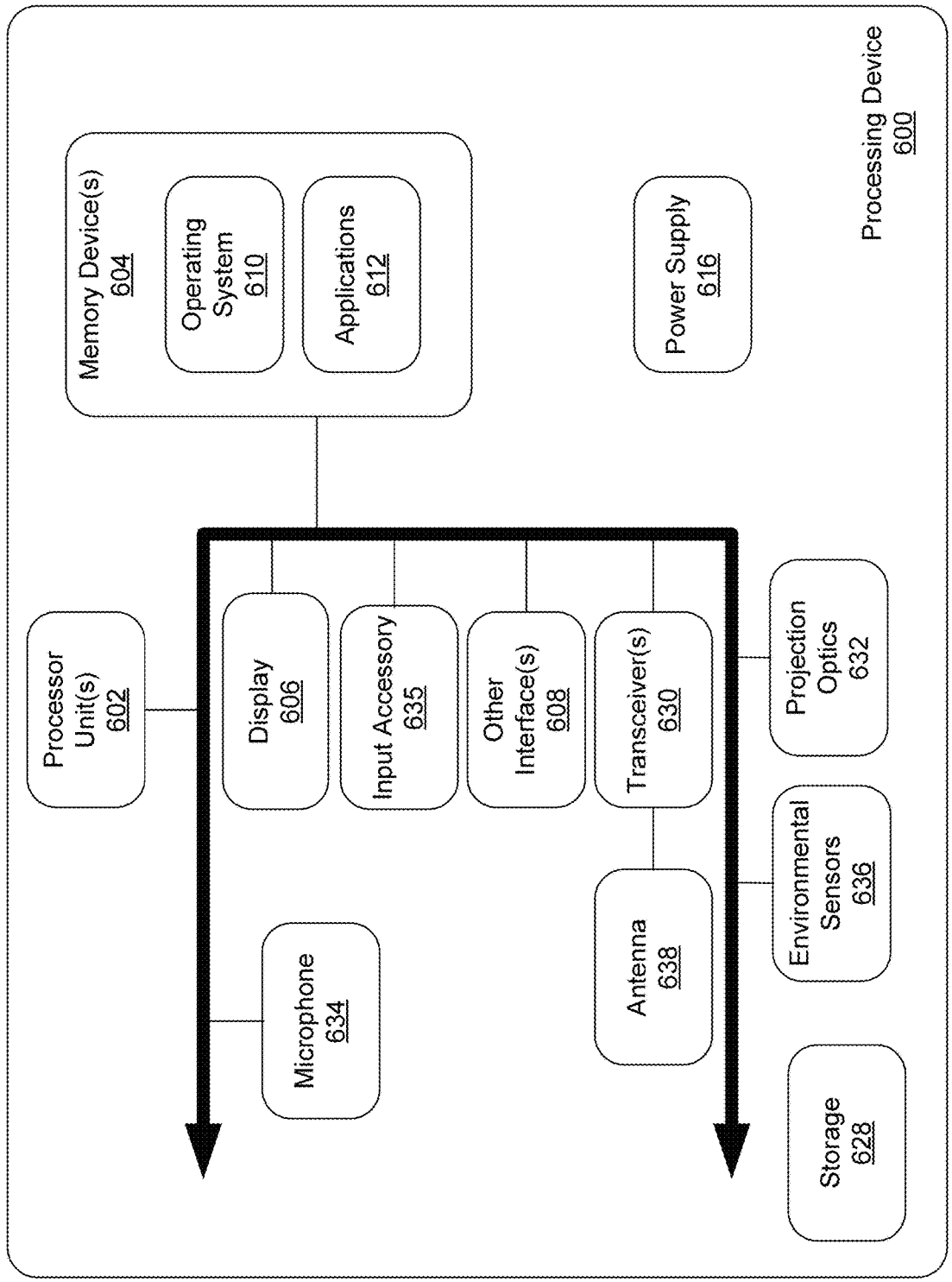
FIG. 6 illustrates an example schematic of a processing device suitable for implementing aspects of the disclosed technology

FIG. 6 illustrates an example schematic of a processing device 600 suitable for implementing aspects of the disclosed technology. The processing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612, such as the depth ray shader 104 of FIG. 1 are loaded in the memory 604 and executed on the operating system 610 by the processor unit(s) 602. Applications 612 may receive input from various input devices such as a microphone 634, input accessory 635 (e.g., keypad, mouse, stylus, touchpad, gamepad, racing wheel, joystick), or various environmental sensors 636 such as one or more cameras, proximity sensors, etc. The processing device 600 includes projection optics 632 for projecting virtual objects of the applications 612 when operating in a VR or AR device mode. The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 includes one or more communication transceivers 630 and an antenna 638 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

In an example implementation, a mobile operating system, various applications (e.g., a depth ray shader) and other modules and services may have hardware and/or software embodied by instructions stored in the memory 604 and/or the storage devices 628 and processed by the processor unit(s) 602. The memory 604 may be the memory of a host device or of an accessory that couples to the host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a depth ray shader that receives a depth map defining a depth in association with each of a plurality of pixels forming a three-dimensional scene and defines a color gradient between a first pixel value and a second pixel value, wherein each sequential step in the color gradient between the first pixel value and the second pixel value is associated with a corresponding depth of increasing magnitude. The depth ray shader provides an instruction executable by a graphics engine to apply a depth ray layer to a select portion of the three-dimensional scene to alter each pixel in the select portion of the three-dimensional scene to assume a pixel value selected from the color gradient that corresponds to the depth associated with the pixel by the depth map.

In another example system according to any preceding system, the select portion of the three-dimensional scene is bounded by a perimeter encompassing at least one foreground object defined by pixels internal to the perimeter and excluded from the depth ray layer. In still another example system accordingly to any preceding system, the depth ray layer alters pixel values of at least one background object of the three-dimensional scene.

In yet another example system of any preceding system, the select portion of the three-dimensional scene includes a transparent foreground object and the depth ray layer alters pixel values internal to a boundary of the transparent foreground object to illustrate a shape of at least one background object.

In yet another example system of any preceding system, the depth ray shader defines the color gradient based on pixel values of at least one foreground object in the select portion of the three-dimensional scene such that each value of the defined color gradient provides at least a threshold contrast ratio with the at least one foreground object.

In still another example system of any preceding system, the depth ray shader defines the color gradient based on a user-selectable color preference.

In yet still another example system of any preceding system, the color gradient defines a range of pixel values of a same hue that vary from another in at least one of tint, tone, and shade.

An example method disclosed herein includes receiving a depth map defining a depth in association with each of a plurality of pixels forming a three-dimensional scene and defining a color gradient between a first pixel value and a second pixel value such that each sequential step in the color gradient between the first pixel value and the second pixel value is assigned to a corresponding depth of increasing magnitude. The method further includes providing an instruction executable by a graphics engine to apply a depth ray layer to a select portion of the three-dimensional scene to alter each pixel in the select portion of the three-dimensional scene to assume a pixel value included within the color gradient that corresponds to the depth associated with the pixel by the depth map.

In another example method of any preceding method, a select portion of the three-dimensional scene is bounded by a perimeter encompassing at least one foreground object and the foreground object is defined by pixels internal to the perimeter that are excluded from the depth ray layer.

In still another example method of any preceding method, the depth ray layer alters pixel values of at least one background object of the three-dimensional scene.

In yet another example method of any preceding method, the select portion of the three-dimensional scene includes a transparent foreground object, and the depth ray layer alters pixel values internal to a boundary of the transparent foreground object to illustrate a shape of at least one background object.

In still another example method of any preceding method, defining the color gradient further comprises defining the color gradient based on pixel values of at least one foreground object in the select portion of the three-dimensional scene such that each value of the defined color gradient provides at least a threshold contrast ratio with the at least one foreground object.

In yet another example method of any preceding method, the color gradient is defined based on a user-selectable color preference.

In still another example method of any preceding method, the color gradient includes a range of pixel values of a same hue that vary from another in at least one of tint, tone, and shade.

An example computer process disclosed herein includes receiving a depth map defining a depth in association with each of a plurality of pixels forming a three-dimensional scene and defining a color gradient between a first pixel value and a second pixel value such that each sequential step in the color gradient between the first pixel value and the second pixel value is assigned to a corresponding depth of increasing magnitude. The computer process further includes providing an instruction executable by a graphics engine to apply a depth ray layer to a select portion of the three-dimensional scene, the depth ray layer altering each pixel in the select portion of the three-dimensional scene to assume a pixel value included within the color gradient that corresponds to the defined depth associated with the pixel by the depth map.

In another example computer process according to any preceding computer process, the select portion of the three-dimensional scene is bounded by a perimeter encompassing at least one foreground object defined by pixels internal to the perimeter that are excluded from the depth ray layer.

In still another example computer process according to any preceding computer process, the depth ray layer alters pixel values of at least one background object of the three-dimensional scene.

In yet another example computer process according to any preceding computer process, the color gradient is defined based on pixel values of at least one foreground object in the select portion of the three-dimensional scene such that each value of the defined color gradient provides at least a threshold contrast ratio with the at least one foreground object.

In another example computer process according to any preceding computer process, the select portion of the three-dimensional scene includes a transparent foreground object and the depth ray layer alters pixel values internal to a boundary of the transparent foreground object to illustrate a shape of at least one background object.

In still another example computer process of any preceding computer process, the color gradient is defined based on a user-selectable color preference.

An example method disclosed herein includes a means for receiving a depth map defining a depth in association with each of a plurality of pixels forming a three-dimensional scene; a means for defining a color gradient between a first pixel value and a second pixel value such that each sequential step in the color gradient between the first pixel value and the second pixel value is assigned to a corresponding depth of increasing magnitude; and a means for providing an instruction executable by a graphics engine to apply a depth ray layer to a select portion of the three-dimensional scene to alter each pixel in the select portion of the three-dimensional scene to assume a pixel value included within the color gradient that corresponds to the depth associated with the pixel by the depth map.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   memory; and
   a depth ray shader stored in the memory and executable to:
   receive a depth map defining a depth in association with each of a plurality of pixels forming a three-dimensional scene;
   define a color gradient between a first pixel value and a second pixel value, wherein each sequential step in the color gradient between the first pixel value and the second pixel value is associated with a corresponding depth of increasing magnitude; and
   provide an instruction executable by a graphics engine to apply a depth ray layer to a select portion of the three-dimensional scene defined by a perimeter, the depth ray layer altering values of pixels internal to the perimeter while pixels external to the perimeter remain unchanged by the depth ray layer, the altered pixels internal to the perimeter illustrating the shape of at least one background object and each assuming a pixel value selected from the color gradient that corresponds to the depth associated with the pixel by the depth map.

2. The system of claim 1, wherein the select portion of the three-dimensional scene is bounded by a perimeter encompassing at least one foreground object, the foreground object defined by pixels internal to the perimeter and excluded from the depth ray layer.

3. The system of claim 2, wherein the depth ray layer alters pixel values of at least one background object of the three-dimensional scene.

4. The system of claim 1, wherein the select portion of the three-dimensional scene includes a transparent foreground object, the depth ray layer altering pixel values internal to a boundary of the transparent foreground object to illustrate a shape of at least one background object.

5. The system of claim 1, wherein the depth ray shader defines the color gradient based on pixel values of at least one foreground object in the select portion of the three-dimensional scene, each value of the defined color gradient providing a threshold contrast ratio with the at least one foreground object.

6. The system of claim 1, wherein the depth ray shader defines the color gradient based on a user-selectable color preference.

7. The system of claim 1, wherein the color gradient defines a range of pixel values of a same hue that vary from another in at least one of tint, tone, and shade.

8. A method comprising:
   receiving a depth map defining a depth in association with each of a plurality of pixels forming a three-dimensional scene;
   defining a color gradient between a first pixel value and a second pixel value, wherein each sequential step in the color gradient between the first pixel value and the second pixel value is assigned to a corresponding depth of increasing magnitude; and
   providing an instruction executable by a graphics engine to apply a depth ray layer to a select portion of the three-dimensional scene defined by a perimeter, the depth ray layer altering values of pixels internal to the perimeter while pixels external to the perimeter remain unchanged by the depth ray layer, the altered pixels internal to the perimeter illustrating the shape of at least one background object and each assuming a pixel value included within the color gradient that corresponds to the depth associated with the pixel by the depth map.

9. The method of claim 8, wherein the select portion of the three-dimensional scene is bounded by a perimeter encompassing at least one foreground object, the foreground object defined by pixels internal to the perimeter and excluded from the depth ray layer.

10. The method of claim 8, wherein the depth ray layer alters pixel values of at least one background object of the three-dimensional scene.

11. The method of claim 8, wherein the select portion of the three-dimensional scene includes a transparent foreground object, the depth ray layer altering pixel values internal to a boundary of the transparent foreground object to illustrate a shape of at least one background object.

12. The method of claim 8, wherein defining the color gradient further comprises defining the color gradient based on pixel values of at least one foreground object in the select portion of the three-dimensional scene, each value of the defined color gradient providing a threshold contrast ratio with the at least one foreground object.

13. The method of claim 8, wherein defining the color gradient further comprises defining the color gradient based on a user-selectable color preference.

14. The method of claim 8, wherein the color gradient includes a range of pixel values of a same hue that vary from another in at least one of tint, tone, and shade.

15. One or more computer-readable storage media of a tangible article of manufacture encoding instructions for executing a computer process comprising:
   receiving a depth map defining a depth in association with each of a plurality of pixels forming a three-dimensional scene;
   defining a color gradient between a first pixel value and a second pixel value, wherein each sequential step in the color gradient between the first pixel value and the second pixel value is assigned to a corresponding depth of increasing magnitude; and
   provide an instruction executable by a graphics engine to apply a depth ray layer to a select portion of the three-dimensional scene defined by a perimeter, the depth ray layer altering values of pixels internal to the perimeter while pixels external to the perimeter remain unchanged by the depth ray layer, the altered pixels internal to the perimeter illustrating the shape of at least one background object and each assuming a pixel value included within the color gradient that corresponds to the defined depth associated with the pixel by the depth map.

16. The one or more computer-readable storage media of claim 15, wherein the select portion of the three-dimensional scene is bounded by a perimeter encompassing at least one foreground object, the foreground object defined by pixels internal to the perimeter and excluded from the depth ray layer.

17. The one or more computer-readable storage media of claim 15, wherein the depth ray layer alters pixel values of at least one background object of the three-dimensional scene.

18. The one or more computer-readable storage media of claim 15, wherein defining the color gradient further comprises defining the color gradient based on pixel values of at least one foreground object in the select portion of the three-dimensional scene, each value of the defined color gradient providing a threshold contrast ratio with the at least one foreground object.

19. The one or more computer-readable storage media of claim 15, wherein the select portion of the three-dimensional scene includes a transparent foreground object, the depth ray layer altering pixel values internal to a boundary of the transparent foreground object to illustrate a shape of at least one background object.

20. The one or more computer-readable storage media of claim 15, wherein defining the color gradient further comprises defining the color gradient based on a user-selectable color preference.

* * * * *